United States Patent

Kumagai

[11] Patent Number: 4,564,904
[45] Date of Patent: Jan. 14, 1986

[54] ELECTRONIC CASH REGISTER

[75] Inventor: Akira Kumagai, Tokyo, Japan

[73] Assignee: Casio Computer Co., Ltd., Tokyo, Japan

[21] Appl. No.: 690,817

[22] Filed: Jan. 11, 1985

Related U.S. Application Data

[63] Continuation of Ser. No. 496,332, May 20, 1983, abandoned, which is a continuation of Ser. No. 184,387, Sep. 5, 1980, abandoned.

[30] Foreign Application Priority Data

Sep. 10, 1979 [JP] Japan .................. 54-115888
Nov. 1, 1979 [JP] Japan .................. 54-141823

[51] Int. Cl.⁴ .................................. G06F 15/21
[52] U.S. Cl. .......................... 364/405; 364/900
[58] Field of Search ... 364/200 MS File, 900 MS File, 364/405

[56] References Cited

U.S. PATENT DOCUMENTS

| | | | |
|---|---|---|---|
| 4,159,533 | 6/1979 | Sakurai | 364/900 |
| 4,186,439 | 1/1980 | Shimura | 364/405 |
| 4,213,179 | 7/1980 | Hamano et al. | 364/900 |
| 4,245,311 | 1/1981 | Nakamura | 364/405 |
| 4,389,707 | 6/1983 | Tsuzuki . | |

Primary Examiner—Thomas M. Heckler
Attorney, Agent, or Firm—Frishauf, Holtz, Goodman & Woodward

[57] ABSTRACT

An electronic cash register comprises first and second memories for storing the total accumulated sales data, and a start data storing memory for storing a time period corresponding to when a settlement operation of the second memory is to be performed. During the course of the settlement operation of the first memory, the cash register checks as to whether the time period has terminated or not. When it is lapsed, the settlement operation of the second memory is automatically executed.

12 Claims, 8 Drawing Figures

ELECTRONIC CASH REGISTER

This application is a continuation of application Ser. No. 496,332, filed May 20, 1983, abandoned, which is a continuation of U.S. Ser. No. 184, 387, filed Sept. 5, 1980, abandoned.

FIELD OF THE INVENTION

The present invention relates to an electronic cash register in which sales data inputted within a given time period is accumulated every time the data is inputted.

DESCRIPTION OF PRIOR ART

Generally, an electronic cash register has a first memory for storing various sales total data such as department sales total, transaction sales total and clerk sales total, and accumulatively adds sales amounts inputted or keyed in to the various sales total data every time sales amounts are keyed in. The sales total data stored in the first memory is read out after a shop is closed.

In addition to the first memory, another known cash register has a second memory for obtaining month and week total of various registered data. For the month total, for example, the day when the data thus accumulated are to be totalized is previously recorded by a supervisor and the data stored in the second memory is totalized (settlement operation) by actuating a given key on the totalizing day.

The known cash resister of this type, however, involves some problems to be solved. The supervisor must keep the totalizing or settlement day in his mind. He may fail to notice that the totalizing day has arrived and may realize a few days later that the day has gone. In such a case, it is no longer meaningful to compare the data accumulated for a given period (e.g. one month) with data accumulated for a longer period (i.e. one month and a few days).

SUMMARY OF THE INVENTION

Accordingly an object of the present invention is to provide an electronic cash register of the type having first and second memories in which a reset or settlement operation of the second memory is automatically performed by previously storing the period for executing the reset operation of the second memory.

In an electronic cash register according to the present invention, the electronic cash register comprises a keyboard including a data input key and a start data input key for keying in start data representing a start point of a reset or settlement operation; a central processing unit coupled with the keyboard; a first memory having a plurality of memory places for storing accumulated sales amounts, and which is coupled with the central processing unit; a second memory coupled with the central processing unit and having a plurality of memory places for storing the data stored in the respective memory places of the first memory and accumulated sales amounts at the reset or settlement operation of the first memory; and start data storing means coupled with the central processing unit for storing start data representing a start point of the reset operation of the second memory by operating the start data input key; whereby the central processing unit automatically starts the settlement operation of the second memory, following the end of the settlement operation of the first memory, when it is detected that the start data represents the start point.

With such an arrangement, the reset or settlement operation of the second memory is automatically performed. This fact remarkably reduces an operation load of an operator and further prevents the operator from failing to notice to perform the settlement operation of the second memory. As a result, all the data outputted by the settlement operation is correct.

DETAILED DESCRIPTION

Figure 1:
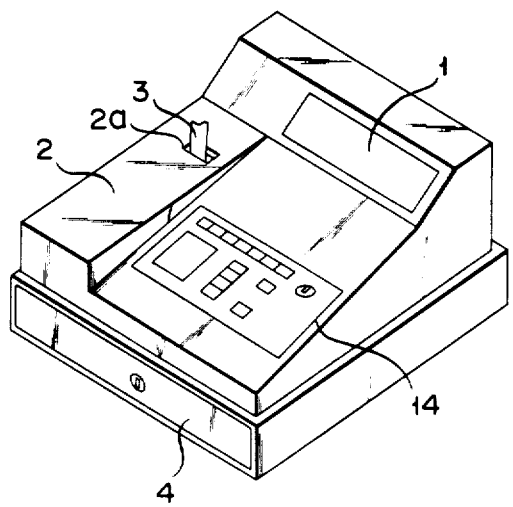
FIG. 1 is an external view of an electronic cash register according to an embodiment of the present invention.

Reference first is made to FIG. 1 illustrating an external view of an electronic cash register according to the present invention. In the FIG. 1, reference numeral 1 designates a display section; 2 a printing section; 3 a receipt issued from a receipt issuing port 3a; 4 a drawer for storing cash; and 14 a keyboard including a data input key and a start data input key.

Figure 2:
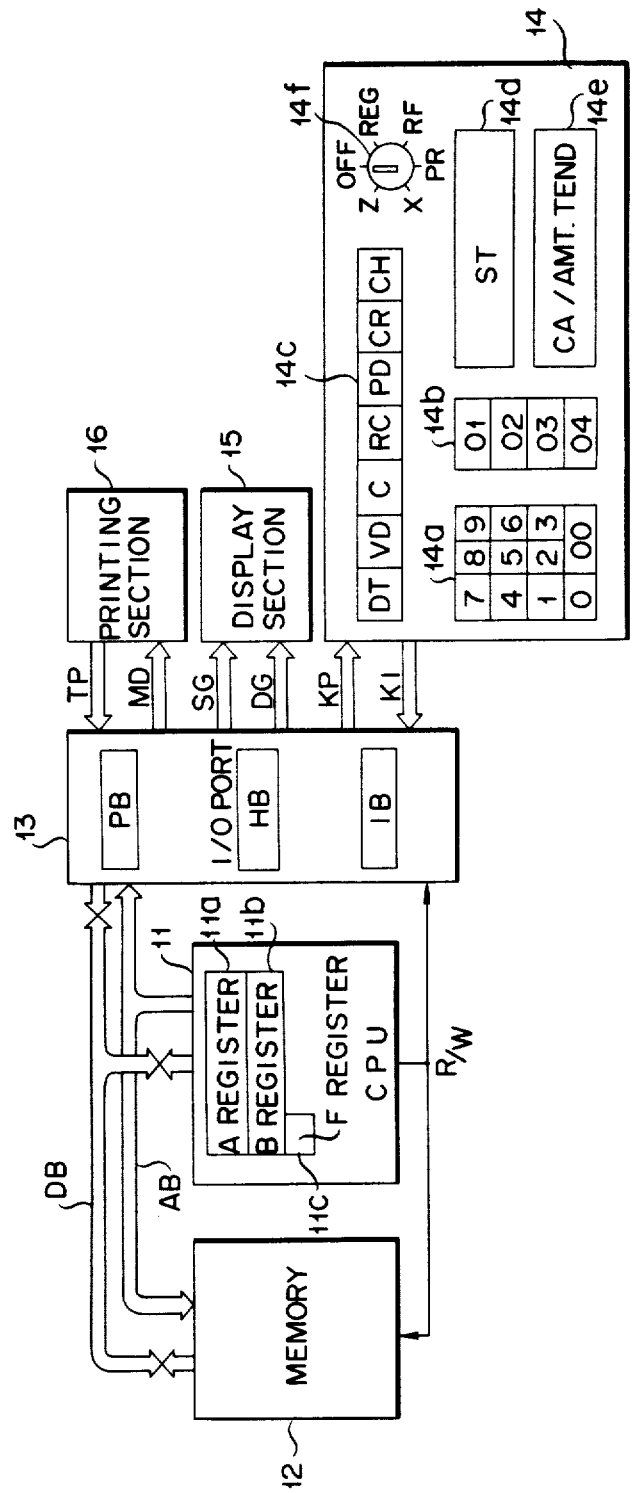
FIG. 2 is a circuit arrangement of the electronic cash register of the invention.

Turning now to FIG. 2, there is shown a system diagram of an electronic cash register. In FIG. 2, a central processing unit 11 includes an A register 11a, a B register 11b and an F register 11c, and is connected to a memory 12 and an I/O port 13, through a data bus DB for transferring data and an address bus AB for transferring an address signal. An R/W signal to specify read-/write data from the CPU is applied to an I/O port 13 and the memory 12. The I/O port 13 is connected to the keyboard 14, a display section 15, and a printing section 16. A timing signal KP is applied from the I/O port 13 to the keyboard 14. When a key is operated, a key-in signal KI corresponding to the key operated is inputted into an input buffer register IB in the I/O port 13. The display section 15 responds to a digit signal DG from the I/O port 13 and a segment signal SG resulting from decoding the data derived from a display buffer HB and actuates the display operation. The printing section 16, for example, a line printer, transfers a printing position signal TP of a printing drum to an I/O port 13. The I/O port 13 checks as to whether the position signal TP coincides with data in the printing buffer register PB or not. A hammer drive signal produced when those are coincident with each other is transferred back to the printing section 16. Upon receipt of the signal MD, the printing section 16 performs necessary printings of a receipt sheet and a journal sheet.

The construction of the keyboard section 14 will be described. Reference numeral 14a designates an entry key for entering amounts of goods; 14b a department key for specifying a department of goods; 14c transaction keys such as a data key DT to set a date data and a transaction count, a void key VD, a clear key C, a receipt key RC, a paid out key PD, a credit key CR and charge key CH; 14d a subtotal key ST to make a total; a cash amount tendered key Ca/AMT TEND for keying in cash sales amount or received amount and issuing a receipt sheet. Reference numeral 14f designates a mode switch for switching modes such as "OFF", "REG", "RF", "PR", "X", and "Z". In the mode switch 14f, "OFF" indicates the cash register is in OFF. "REG" is registering mode for performing an ordinary sales amount registering operation. "RF" is a refund mode to refund a part of the amount registered in the cash register. "PR" denotes a preset mode for setting preset data. "X" denotes a read mode for reading out stored data without destroying it. "Z" is a reset operation mode to "clear" after the stored data is read out.

Although not shown, the memory 12 includes a battery for memory protection so that the memory contents of the memory 12 is protected even if the mode switch is turned to the "OFF" mode.

Figure 3:
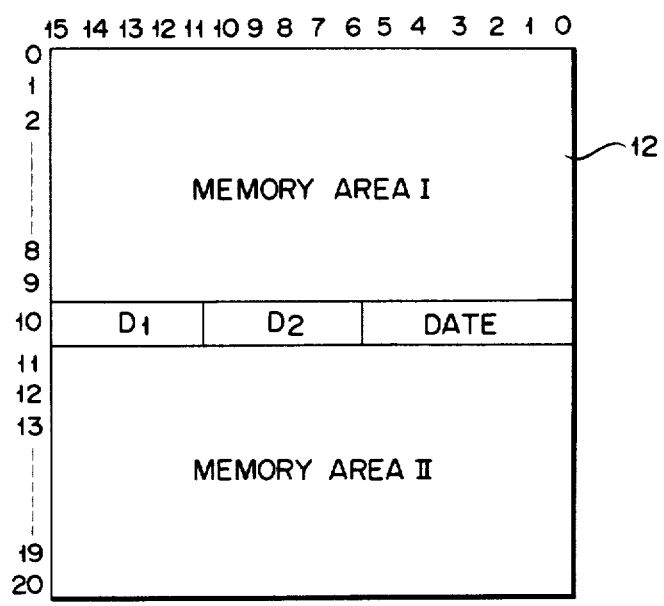
FIG. 3 illustrates a memory area of a memory used in the cash register of the invention.

FIG. 3 shows a memory area of the memory 12 in FIG. 2. In the memory area I of the memory 12, the accumulated value of the sales data in a day are stored in the transaction and department memory places, etc. In a memory area II, the accumulated value of various sales data for a specific period are stored in memory places which are equal in number to those in the memory area I. In the memory area of the memory 12, 0th to 5th columns on the 10th row define a memory area DATE for storing date data representing the day when the date key DT is operated; 6th to 10th columns on the 10th row, a memory area D2 for storing a data representing a predetermined number of days on the last of which sales data are to be totalized; 11th to 15th colums on the 10th row, a memory area D1 for storing data representing the number of the remaining days including the last day on which sales data are to be totalized.

Figure 4:
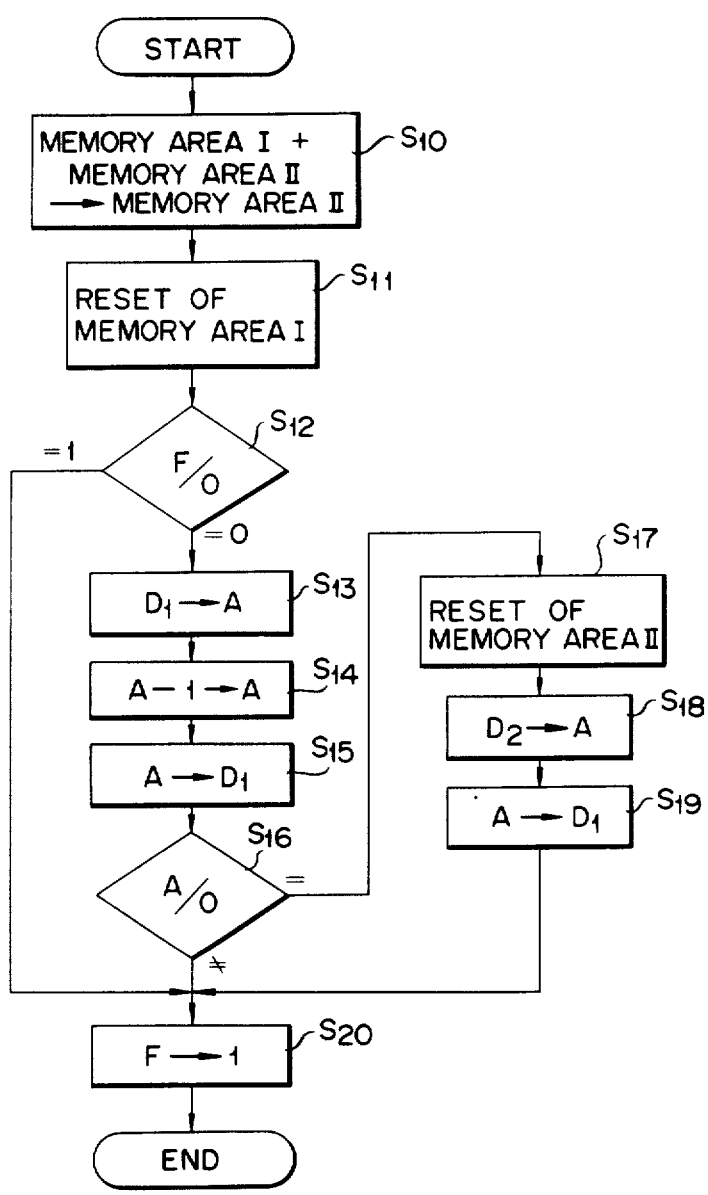
FIGS. 4 to 7 are flow charts useful in explaining the operation of the cash register.

The operation of the first embodiment when a settlement operation is made after a lapse of an initially set date will be explained below. In FIGS. 2 to 4, firstly, the mode switch 14f on the key board 14 is set to the preset mode "PR", and then the entry key, the "DT" key and "Ca/AMT TEND" key are actuated in this order. The entry key is actuated to enter the totalizing day data. When the totalizing days previously set are "30" days, for example, "3" and "0" keys are depressed in this order. Upon the key operations, a key input signal KI corresponding to a timing signal KP derived from the I/O port 13 is transferred to the I/O port 13 and in turn the data corresponding to the key input signal KI is inputted to the input buffer register IB in the I/O port 13. The data stored in the input buffer register IB is read into the CPU 11 via the data bus DB in response to an R/W signal from the CPU 11. Then, numerical data "30" is stored into the memory area D1 and D2 in the memory 12 which are specified by an address signal transferred from the CPU 11 through the address bus AB.

In the next step, for resetting the sales data in the memory area I, the mode switch 14f is set to the reset mode "Z" and the "Ca/AMT TEND" key 14e is operated. The result of the operation is the execution of a flow chart shown in FIG. 4.

In the flow chart in FIG. 4, in step S10 the accumulated values of the various sales data are added to the corresponding memory places in the memory area II. Specifically, the data on the first lines in the memory areas I and II are transferred to an A register 11a and a B register 11b within the CPU 11, respectively, and those are added to each other by an arithmetic logic section (not shown). The result of the addition is again stored in the B register 11b and then is transferred to given memory places in the memory area II. In the next step S11, the data in the memory area I is cleared. The data stored in the memory area I is sequentially read out every line of the memory 12 in response to an R/W signal from the CPU 11 and is inputted into a printing buffer register PB in the I/O port 13. Upon the coincidence of the contents of the buffer register PB with a printing position signal TP, a hammer drive signal MD is transferred out from the I/O port 13, so that the printing section 16 performs the printing operation on the receipt sheet and the journal sheet. After all the contents of the memory area I are printed, the CPU 11 loads "0" into all the memory places in the memory area I, thereby to clear all the data.

In step S12, it is judged whether the contents of the F register 11c in the CPU 11 are "0" or not. The F register 11c is cleared when the date is set every day and the sales data is reset. At this time, it is set to "1". When the contents of the F register 11c are "1", that is to say, when the sales data is reset, the CPU 11 advances to a step S20 in the program execution. When it is judged that the contents of the F register 11c is "0", the totalizing days data in the memory area D1 of the memory 12 is loaded into the A register 11a in the CPU 11 through the data DB by an R/W signal from the CPU 11. Further, in a step S14, "−1" is subtracted from the contents of the A register 11a. In a step S15, a value stored in the A register 11a is stored into the memory area D1 of the memory 12 specified by an address transferred through the address bus AB from the CPU 11, through the data bus DB in response to an R/W signal from the CPU 11. Through a sequence of the steps S13 to S15, the totalizing days data previously set in the memory area D1 of the memory 12 is subjected to the "−1" operation. Then, in a step S16, it is checked whether the data stored in the A register 11a is "0" or not. When it is not "0", it is judged that the totalizing dates previously set are not yet elapsed. The CPU 11 advances to a step S20. On the other hand, when the judging result of the step S16 is "0", the totalizing days are elapsed. In step S17 the accumulated value of the various sales data within the given period stored in the memory area II of the memory 12 is reset. The process of the resetting is the same as that of the memory area I. In a step S18, the preset totalizing days data "30" stored in the memory area D2 of the memory 12 is stored in the A register 11a within the CPU 11. Subsequently, in a step S19, the totalizing days data stored in the A register 11a is stored into the memory area D1 within the memory 12. Through the process of the steps S18 and S19, the initial value of the totalizing days data set by the key operation is again stored into the memory area D1 in the memory 12. Then, the CPU 11 executes a step S20 to load "1" into the F register 11c within the CPU 11. At this point, the process is completed. Since the "1" in the F register 11c is not cleared until a data is not set, the totalizing days data in the memory area D1 is not subjected to the "−1" operation even if the reset is made two times or more a day. Therefore, every time the "30 days" are elapsed, it is possible to automatically reset the total data as an accumulation of the sales data for 30 days stored in the memory area II of the memory 12.

A second embodiment of the electronic cash register according to the present invention will be described hereinafter. Firstly, the mode switch 14f of the keyboard 14 is set to the preset mode "PR" and the entry key, the "DT" key, and the "Ca/AMT TEND" key are actuated in this order. When a date of the totalizing end preset is "June 30", for example, the key operations to be performed are "6", "DT", "3", "0" and "Ca/AMT TEND". The data corresponding to the key actuated is inputted into the input buffer register IB within the I/O port 13. The data stored in the input buffer register IB is read into the CPU 11 via the data bus DB in response to an R/W signal from the CPU 11, and then is loaded into the memory area D1 in the memory 12 specified by the address transferred through the address bus AB from the CPU 11.

Figure 5:
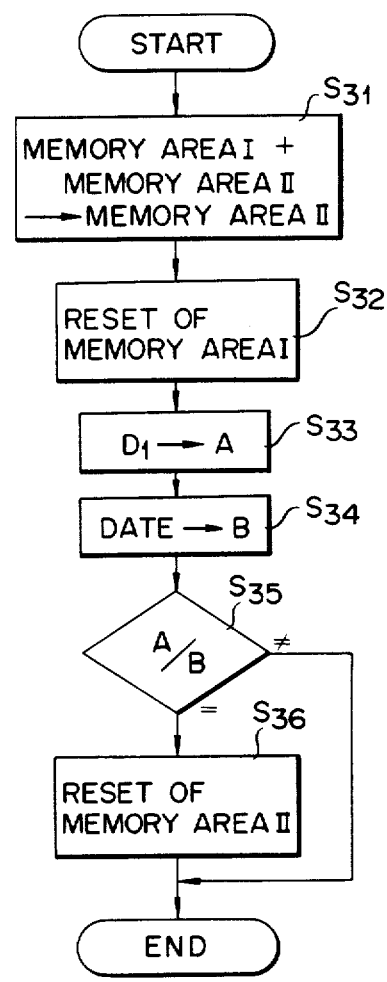

For resetting the sales data in the memory area I, the mode switch 14f is set to the reset mode "Z" and the "Ca/AMT TEND" key 14e is operated, so that a flow chart shown in FIG. 5 is performed.

In a step S31 in FIG. 5, various registered data stored in the memory area I in the memory 12 are subjected to an addition operation and the result of the addition is added in the memory area II. Specifically, the data on single lines in the memory areas I and II are transferred to the A register 11a and the B register 11b in the CPU 11 and then are summed by an arithmetic logic circuit (not shown). The result of the addition is again stored in the B register 11b, and transferred to given places in the memory area II. A sequence of those operations are cyclically performed. In a step S32, the data in the memory area I is reset. The data stored in the memory area I are sequentially read out every line of the memory 12 in response to an R/W signal from the CPU 11 and are inputted to a printing buffer register PB in the I/O port 13. Upon the coincidence of the contents of the printing buffer register PB with the printing position signal TP, a hammer drive signal MD is transferred from the I/O port 13 to the printing section 16 where the receipt sheet and the journal sheet are printed. Then, all the contents of the memory area I are printed, the CPU 11 writes "0" into all the memory places in the memory area I, thereby to clear the data stored. In the subsequent step S33, the total end date data stored in the memory area D1 of the memory 12 is stored into the A register 11a in the CPU 11 via the data bus DB in response to an R/W signal from the CPU 11. In a step S34, the date data of the operating day stored in the memory area DATE of the memory 12 is loaded into the B register 11b in the CPU 11 via the data bus DB by the R/W signal from the CPU 11. Then, in a step S35, the contents of the A register 11a and the B register 11b are compared. When both the contents are coincident with each other, that is to say, the day is the totalizing day, the CPU 11 steps to a step S36. In the steps the sales data accumulated in the memory area II of the memory 12 until the totalizing day are totalized. The process of the step is the same as that of the reset in the memory area I. In the step S35, when the contents of the A register is not coincident with that of the B register 11b, that is to say, the day is not the totalizing day, the CPU 11 ends the process flow without the execution of the step S36. In this way, when the totalizing day previously set by the key operation comes, the cash register may automatically reset the total data of the various sales data until the totalizing day stored in the memory area II.

A third embodiment of the cash register will be described. In the embodiment, the mode switch 14f of the key board 14 is turned to the preset mode "PR" and the entry key, the "DT" key, the "Ca/AMT TEND" key are successively operated. The totalizing day data to be set is keyed in by the entry key. When the totalizing day data is "30 days", for example, "3" and "0" keys are operated. As a result of the key operations, the data corresponding of the operated keys are inputted into the input buffer register IB within the I/O port 13. The data stored in the buffer register IB is read into the CPU 11 via the data bus DB by an R/W signal from the CPU 11, and is stored into the memory area D of the memory 12 specified by the address transferred through the address bus AB from the CPU 11. At this time, the memory area D1 in the memory 12 is cleared.

For resetting the sales data in the memory area I, the mode switch 14f is turned to the reset mode "Z" and the "Ca/AMT TEND" 14e is operated. Upon the operation, a flow chart shown in FIG. 6 is executed.

Figure 6:
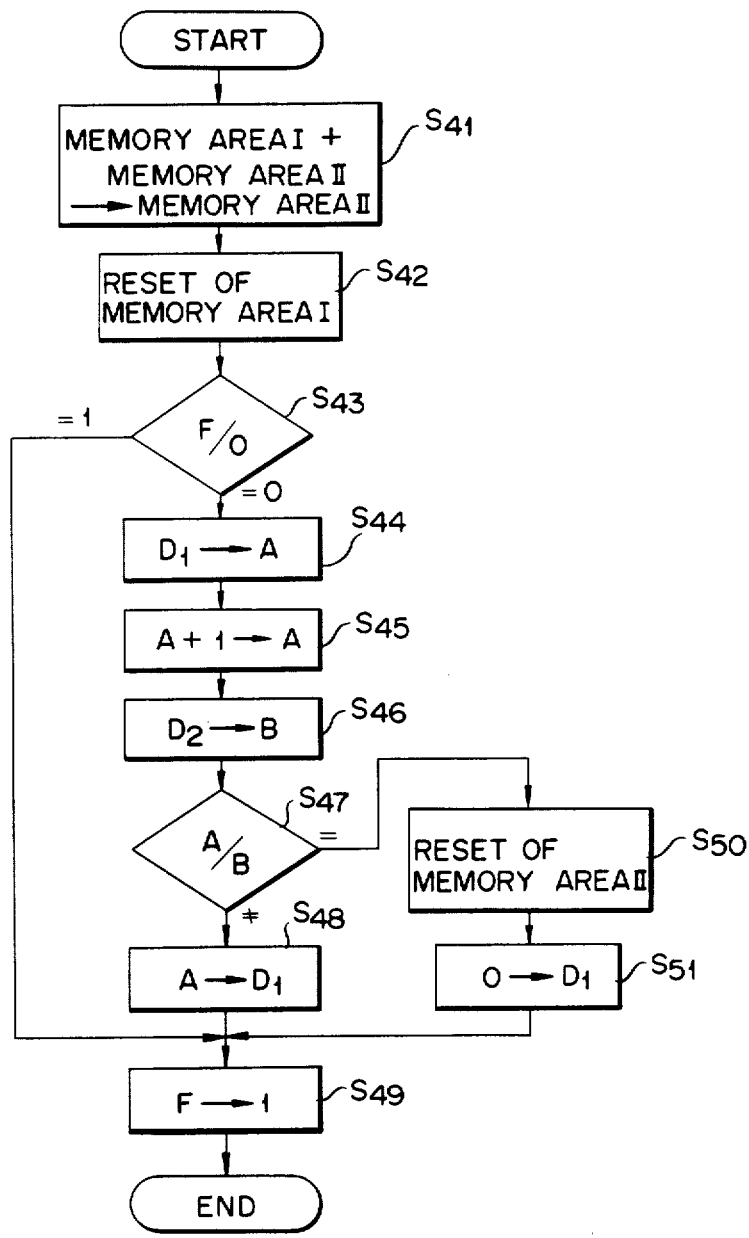

Also in this embodiment, the process from steps S41 to S43 shown in FIG. 6 is executed. Those steps are the same as those S10 to S12 shown in FIG. 3 and therefore no explanation of them will be given. In the step S43, when the contents of the F register 11c in the CPU 11 is "1", that is to say, when the sales data is reset, the CPU 11 advances to a step S49 in the program execution. When the contents of the F register 11c is "0", a step S44 stores the data stored in the memory area D1 of the memory 12 into the A register 11a in the CPU 11 through the data bus DB, by the R/W signal from the CPU 11. A step S45 performs a "+1" operation of the contents of the A register 11a. Then, a step S46 loads into the B register 11b the totalizing day data stored in the memory area D2 within the memory 12. In a step S47, the contents of the A register 11a are compared with those of the B register. If those are not coincident with each other, a step S48 is executed. In a step S48, the contents stored in the A register 11a are loaded, by the R/W signal from the CPU 11, through the data bus into the memory area D1 of the memory 12 specified by an address transferred through the address bus AB from the CPU 11. In a step S47, the contents of the A register 11a are compared with those in the B register 11b. If those are equal to each other, a step S50 is executed. In this step, the sales data within a specified period stored in the memory area II of the memory 12 is reset. The reset process is the same as that of the memory area I. Then, a step S50 loads "0" into the memory area D1 of the memory 12. Then, "1" is loaded into the F register 11c in the CPU 11 and the process is finished. Even if the "Ca/AMT TEND" key 14e is operated two times or more a day in the reset mode "Z" by the F register 11c, the number of days elapsed stored in the memory area D1 is subjected to the "+1" operation. As a result, it is possible to automatically reset the totalizing day data for 30 days stored in the memory area II of the memory 12 every time "30 days" pass.

In the second embodiments, the totalizing day data is written into the memory area D1 at the time of the setting. The contents of the memory area DATE storing day data are compared with those of the memory area D1 in the reset mode by the "Ca/AMT TEND" key operation. When those are coincident with each other, the memory area II is reset. Alternatively, at the time of the setting, the totalizing day data is stored into the memory area D1 and a data at the time of the setting is stored into the memory area D2. Every time the "Ca/AMT TEND" key is depressed in the reset mode, the day data stored in the DATE area is subtracted from the data of the setting stored in the memory area D1. Then, the result of the subtraction is compared with the number of the totalizing days stored in the memory area D1. When those are coincident with each other, the memory area II is reset. As a further modification, when the number of the totalizing days is keyed in at the time of the setting, the data of the period end is calculated on the data at the setting stored in the memory area DATE and the totalizing day, and the date is written into the memory area D1. Further, in the case of the ECR (electronic cash register) with a clock, the date of the period end stored in the memory area D1 is compared with the date memory area of the clock circuit.

A fourth embodiment of the electronic cash register according to the present invention will be described hereinafter. In this embodiment, the 0th to 5th columns on the 10th row in the memory 12 define the memory area DATE for storing date data on the day operated; the 6th to 10th columns on the 10th row, a memory area D2 for storing the operation count data; the 11th to 15th columns on the 10th row, a memory area D1 for storing the value when the operation count data is decremented by one every time the "Ca/AMT TEND" key is operated in the reset mode "Z".

The explanation to follow is for the operation of an embodiment when the reset is made when the "Ca/AMT TEND" key 14e is operated by a predetermined number of operations in the reset mode "Z" with such an arrangement. Reference is made to FIGS. 1 to 4, and 7. The mode switch 14f of the keyboard 14 is set to the preset mode "PR", and the entry key, the "DT" key and the "Ca/AMT TEND" key are sequentially operated. Here, the number of operations to previously be set is entered by the entry key. Then, when the number of the preset operations is "30", "3" and "0" keys are operated. Through the operations, the data corresponding to the operated key is inputted into the input buffer register IB of the I/O port 13. The data stored in the input buffer register IB is loaded, by the R/W signal from the CPU 11, through the data bus DB into the CPU 11, and is stored into the memory areas D1 and D2 of the memory 12 specified by the address transferred through the address bus AB from the CPU 11.

Then, for resetting the sales data in the memory area I, the mode switch 14 is set to the reset mode "Z". Upon actuation of the "Ca/AMT TEND" key 14e, a flow chart shown in FIG. 7 is executed.

Figure 7:
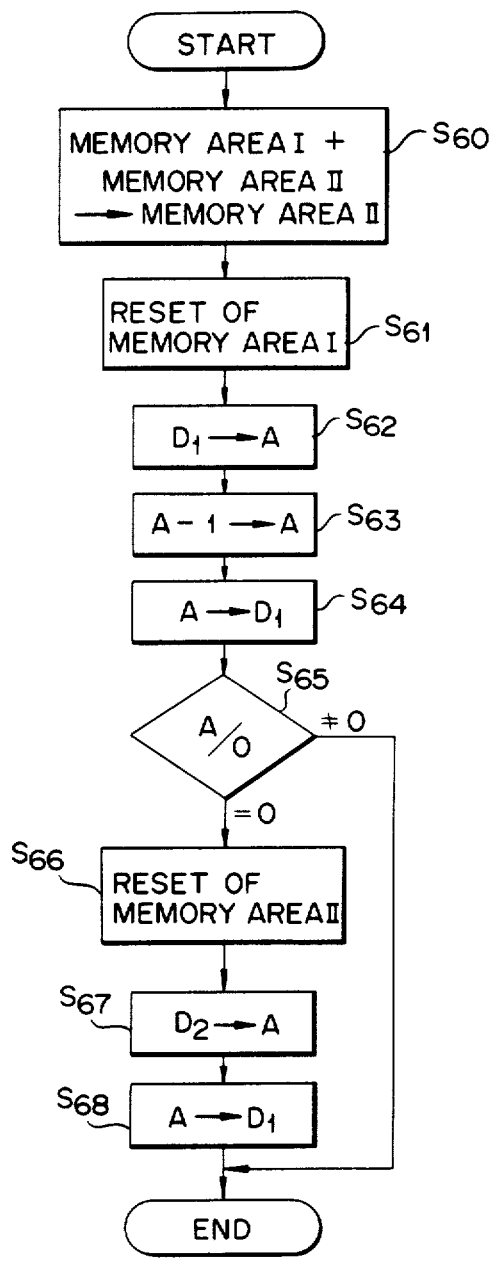

Firstly, in a step S60 of FIG. 7, the various day's accumulated data stored in the memory area I of the memory 12 are added in the memory area II. Specifically, the data on single lines of the memory areas I and II are transferred to the A register 11a and the B register 11b of the CPU 11, and those are added to each other by the arithmetic logic circuit (not shown). The result of the addition is again stored in the B register 11b and then is transferred to given memory places in the memory area II. Next, in a step S61, the data in the memory area I are reset. To be more specific, the data stored in the memory area I are sequentially read out every line of the memory 12 in response to an R/W signal from the CPU 11 and are inputted into the printing buffer register PB in the I/O port 13. Upon the coincidence of the contents of the printing buffer register PB and the printing position signal TP, a hammer drive signal MD is transferred from the I/O port 13, so that the printing section 16 performs the printing operation on the receipt sheet and the journal sheet. After all the contents of the memory area II are printed, the CPU 11 loads "0" into all the memory places in the memory area I, thereby the clear all the data therein.

Then, in a step S62, the operation count data of the memory area D1 in the memory 12 is stored in the A register 11a in the CPU 11 through the data path DB by an R/W signal from the CPU 11 further in a step S63, the contents of an A register 11a are subjected to the "−1" operation. In a step S64, the contents stored in the A register 11a, are stored through a data bus DB by the R/W signal from the CPU 11 in the memory area D1 of the memory 12 specified by an address transferred through the address bus AB from the CPU 11. Through a sequence of the process steps S62 to S64, the preset operation count data stored in the memory area D1 of the memory 12 is subjected to the "−1" operation. In step S65, it is judged whether the data stored in the A register 11a is "0" or not. When the data is not "0", it is judged that the "Ca/AMT TEND" key 14e is not operated by the preset operation count, and the process of the flow chart shown in FIG. 6 is finished. On the other hand, when the result of the step S65 judgement is "0" it is judged that the "Ca/AMT TEND" key 14e is operated by the preset operation count in the reset mode. As a result, in a step S66, the sales data in the designated period stored in the memory area II of the memory 12 are reset. This process is same as that of the reset of the memory area I. In a step S67, the preset operation count data "30" stored in the memory area D2 of the memory 12 is stored in the A register 11a of the CPU 11, and in a step S68, the operation count data stored in the A register 11a is stored in the memory area D1 of the memory 12. In this way, through the processes of the steps S67 and S68, in the memory area D1 of the memory 12, the operation count data set by the key operation is stored again. Therefore, every time the "Ca/AMT TEND" key 14e is operated "30" times in the reset mode "Z" it is possible to automatically reset the total data of the 30-day-sales data stored in the memory area II of the memory 12.

Figure 8:
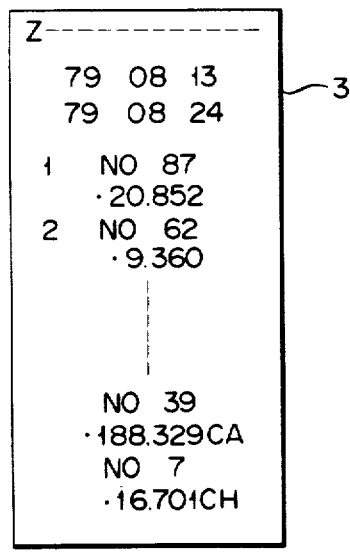
FIG. 8 illustrates a printed receipt issued when the cash register is in the reset operation mode.

In the respective embodiment, an example of the receipt 3 issued in the reset operation of the memory area II is shown in FIG. 8. The data printed on the receipt 3 is always correct, because it is surely outputted for the given period.

Usually, the sales data for the day are added after the sales hours. According to this invention, the sales data made for a predetermined period, e.g. days, are totalized (i.e., settled) automatically at the end of said predetermined period. It is therefore necessary to store data representing the period or the number of days in a memory. To store the data into the memroy, the cash register is set to reset mode, and the "Ca/AMT TEND" key for starting totalization or settlement of the data on sales made for said period is repeatedly operated, for example 30 times if said period is 30 days. Therefore, if sales data are added twice a day, first at noon and then after the sales hours, and if said period is 30 days, the data representing the period is stored into the memory by operating the "Ca/AMT TEND" key 60 times. Then, the sales data accumulated in the second memory means (i.e. memory area II) will be totalized automatically on the last day of the 30-day period.

In the above-described embodiment, the contents of the memory for storing the data representing said predetermined period is decremented by "1" every time the "Ca/AMT TEND" key is operated. Alternatively the contents of the memory, which are, for example, "0", may be incremented by "1" every time the "Ca/AMT TEND" key is operated. Similar modifications are possible within the scope of the invention.

What is claimed is:

1. In an electronic cash register having settlement operation functions, the improvement comprising the combination of:

input means including a data input key and a settlement designation key for designating a settlement operation;

central processing means coupled to said input means;

first memory means coupled to said central processing means and having a plurality of memory places for storing accumulated sales amounts based on given classifications when said data input key is operated, the contents of said first memory means being independently cleared after being read therefrom when said settlement designation key is operated;

second memory means coupled to said central processing means and having a plurality of memory places for storing data, which is accumulated for each of said classifications after being read from said first memory means, the number of said memory places of said second memory means being equal to that of the memory places of said first memory means;

printing means coupled to said central processing means for printing data read from said first memory means; and start data storing means coupled to said central processing means for storing start data representing a start point of a settlement operation for said second memory means;

said central processing means including:

means for accumulating the contents of said first memory means into the contents of said second memory means for each classification responsive to operation of said settlement designation key for said first memory means and, at the same time, for causing printing out by said printing means of the contents of said first memory means as settlement data;

judging means for, when said settlement designation key is operated to designate said settlement operation for said first memory means, judging, based at least on the contents of said start data storing means, whether or not a start point of the settlement operation for said second memory means is reached; and means responsive to said judging means for clearing, during a settlement operation, the contents of said second memory means, independent of clearing of said first memory means, upon completion of supplying the contents of said second memory means to said printing means when said judging means judges that the start point of a settlement operation has been reached.

2. The electronic cash register of claim 1, further comprising a current date memory means coupled to said central processing means for storing current date data; and wherein:

said start data storing means includes means for storing settlement date data to start the settlement operation for said second memory means; and said central processing means being responsive to said judging means judging that current date data in said current date memory means coincides with settlement date data in said start data storing means, for causing a settlement operation for the contents of said second memory means to automatically continue subsequent to the settlement operation for said first memory means.

3. The electric cash register of claim 2, further comprising a time counting circuit coupled to said current date memory means for automatically updating current date data for each day.

4. The electric cash register of claim 1, further comprising:

a current date memory means coupled to said central processing means for storing current date data;

set date storing means coupled to said central processing means for storing set date data; and calculating means for calculating a difference date data obtained by subtracting one of said date data from another of said date data;

said start data storing means including means for storing settlement date data up to the start of the settlement operation for said second memory means;

said set date storing means including means for storing date data corresponding to current date data at a time when the settlement date data is stored in said start data storing means, the set date data of said set date storing means being subtracted by said calculating means from the current date data of said current date memory means upon a settlement operation for said first memory means to obtain said difference date data; said central processing means being responsive to said judging means judging that said difference date data calculated by said calculating means coincides with the settlement date data of said start data storing means, for automatically executing a settlement operation for said second memory means subsequent to said settlement operation for said first memory means.

5. The electronic cash register of claim 1, further comprising lapse-of-day means coupled to said central processing means for storing lapse-of-day data updated by adding "1" for the lapse of each day;

said start data storing means including means for storing predetermined settlement dates as counted until the settlement operation starts for said second memory means; and said central processing means being responsive to said judging means judging that the lapse-of-data of said lapse-of-day storing means coincides with the settlement date data of said start data storing means for automatically continuing a settlement operation for said second memory means subsequent to the settlement operation for said first memory means.

6. The electronic cash register of claim 5, wherein said central processing means includes means for setting the lapse-of-day data of said lapse-of-day storing means to an initial value.

7. The electronic cash register of claim 1, wherein:

said start data storing means stores date data up to the start of the settlement operation for said second memory means; and said central processing means includes means for updating the date data of said start data storing means for each day by subtracting "1"; and means responsive to said judging means judging that the contents of said start data storing means is zero for automatically continuing the settlement operation for said second memory means subsequent to the settlement operation for said first memory means.

8. The electronic cash register of claim 7, further comprising a settlement date storing means coupled to said central processing means for initially storing settlement date data up to the start of the settlement operation for said second memory means; and said central processing means including means for causing writing of the settlement date data of said settlement date storing means into said start data storing means when the settlement operation is effected for said second memory means.

9. The electronic cash register of claim 1, further including settlement number storing means coupled to said central processing means for storing settlement number data to which "1" is added each time a settlement operation is completed for said first memory means;

said start data storing means including means for storing predetermined settlement number data of said first memory means up to the start of the settlement operation for said second memory means; and said central processing means being responsive to said judging means judging that the settlement number date of said settlement number storing means coincides with the settlement number data of said start data storing means for automatically continuing the settlement operation for said second memory means subsequent to the settlement operation for said first memory means.

10. The electronic cash register of claim 9, wherein said central processing means includes means for resetting the settlement number data in said settlement number storing means when a settlement operation is made for said second memory means.

11. The electronic cash register of claim 1, wherein:

said start data storing means includes means for storing the settlement number data of said first memory means up to the start of the settlement operation for said second memory means; and said central processing means includes means for subtracting "1" from the settlement number data of said start data storing means each time a settlement operation is made for said first memory means; and means responsive to said judging means judging that the contents of said start data storing means is zero for automatically continuing the settlement operation for said second memory means subsequent to the settlement operation for said first memory means.

12. The electronic cash register of claim 11, further comprising means coupled to said central processing means for initially storing the settlement number data of said first memory means up to the start of the settlement operation for said second memory means; and said central processing means includes means for causing the writing of the settlement number data of said settlement number storing means into said start data storing means when the settlement operation is made for said second memory means.

* * * * *

UNITED STATES PATENT AND TRADEMARK OFFICE
CERTIFICATE OF CORRECTION

PATENT NO. : 4,564,904

DATED : January 14, 1986

INVENTOR(S) : Akira Kumagai

It is certified that error appears in the above-identified patent and that said Letters Patent is hereby corrected as shown below:

COLUMN 10, line 41 (claim 5), change "lapse-of-data" to --lapse-of-day data--.

Signed and Sealed this

Nineteenth Day of August 1986

[SEAL]

Attest:

DONALD J. QUIGG

Attesting Officer

Commissioner of Patents and Trademarks